United States Patent [19]
Hanson et al.

[11] Patent Number: 6,128,555
[45] Date of Patent: Oct. 3, 2000

[54] IN SITU METHOD AND SYSTEM FOR AUTONOMOUS FAULT DETECTION, ISOLATION AND RECOVERY

[75] Inventors: Mark L. Hanson, Redondo Beach; Lorraine M. Fesq, Playa Del Ray; Mai H. Nguyen, Los Angeles, all of Calif.

[73] Assignee: TRW Inc., Redondo Beach, Calif.

[21] Appl. No.: 08/865,302

[22] Filed: May 29, 1997

[51] Int. Cl.$^7$ .............................. G05D 1/00; G05D 3/00; G06F 17/00
[52] U.S. Cl. .................................. 701/13; 701/2; 701/3; 701/29; 714/1; 714/2; 714/7; 244/158 R
[58] Field of Search ................... 701/13, 2, 29, 701/31, 33, 35; 714/1, 2, 7

[56] References Cited

U.S. PATENT DOCUMENTS

| | | | |
|---|---|---|---|
| 4,654,846 | 3/1987 | Goodwin et al. | 714/13 |
| 4,739,498 | 4/1988 | Eichhorn | 714/7 |

FOREIGN PATENT DOCUMENTS

| | | |
|---|---|---|
| 53069563 | 6/1978 | Japan . |
| 4-222030 | 8/1992 | Japan . |
| 6-274359 | 9/1994 | Japan . |
| 6-337742 | 12/1994 | Japan . |

OTHER PUBLICATIONS

Kawada et al, "Attitude Control Computer System for Spacecraft," *Magazine of Academic Society for Electronic Information and Communication*, p.1215–1221, Nov., 1990. (With Translation).

"Electronic Aerospace Systems", *Japan Association for Aerospace Technology, Association for Radio Systems for Protection of Aerospace*,p. 427–433 and 460–464, Aug. 25, 1995. (With Translation).

Slonski, John P., "System Fault Protection Design for the Cassini Spacecraft," 1996 IEEE Aerospace Applications Conference Proceedings, vol. 1, 1996, New York, NY, pp. 279–292.

Rauch, H.E., "Intelligent Fault Diagnosis and Control Reconfiguration," IEEE Control Systems Magazine, vol. 14, No. 3, Jun. 1994, U.S.A., pp. 6–12.

"Model–based Autonomous Systems in the New Millennium", by Brian C. Williams, Recom Technologies, published May 29, 1996.

"Spacecraft Autonomy in the New Millenium", by Fesq et al., Proceedings of the 19 AAS Guidance and Control Conference, published Feb. 1996.

"A Model–based Approach to Reactive Self–Configuring Systems", by Williams et al., Computational Sciences Division MS 269–2; NASA Ames Research Center, Aug. 4, 1996.

"Model–based Reasoning: Troubshouting", by Davis et al., Mass. Inst. of Tech.

(List continued on next page.)

*Primary Examiner*—Jacques H. Louis-Jacques
*Assistant Examiner*—Eric M. Gibson
*Attorney, Agent, or Firm*—Michael S. Yatsko

[57] ABSTRACT

A fault identification, isolation and fault recovery system autonomously controls spacecraft operational systems. A fault detection and isolation module monitors the operational systems, identifies faults via such monitoring and attempts to isolate component causing the fault. Isolation may constitute a plurality of hierarchically arranged techniques that enhance speed and maximize the likelihood of identifying a correct hypothesis regarding the actual failure. The fault isolation and fault recovery modules are bounded by a severe fault override module which places the spacecraft operational systems in a safe mode or state. Thus, the override module ensures rapid entry into the safe mode while preventing an erroneous hypothesis serviced by the fault recovery module from driving the system beyond acceptable limits. A high level command processor receives command sequences from remote ground support stations and from the on-board fault recovery module. A ground based test bed attached to a ground support systems is used to generate verified high level fault recovery scripts before and during a mission to bolster fault recovery capabilities.

21 Claims, 6 Drawing Sheets

OTHER PUBLICATIONS

"Modeling Power Systems for Diagnosis: How Good is Good Enough?", by Fesq et al., IEEE 27th Intersociety Energy Conversion Engineering Conference (IECEC), published Aug. 1992.

"Model–Based Diagnostics for Space Station Freedom", by Fesq. et al., IEEE 26th Intersociety Energy Conversion Engineering Conference (IECEC), published Aug. 1991.

"Spacecraft Command Verification: The AI Solution", by Fesq. et al., Godard Conference on Space Applications of Artificial Intelligence, published May 1990.

"On–Board Fault Management Using Modeling Techniques", by Fesq. et al., IEEE Intersociety Energy Conversion Engineering Conference, published Aug. 1989.

"Advances in Spacecraft Autonomy Using Artificial Intelligence Techniques", by Fesq et al., Feb. 1989.

"Expert Systems on Spacecraft", by Lorraine M. Fesq.

"Autonomous Spacecraft Executive and Its Application to Rendezvous and Docking", Komoura et al., 3d Int'l Symposium of AI, Robotics and Automation for Space, Oct. 1994.

"An Implemented Architecture Integrating On Board Planning, Scheduling, Execution, Diagnosis, Monitoring and Control for Autonomous Spacecraft", Pell et al., Proceedings of SPIE Conference on Optical Science, Engineering, and Automation, 1996.

"A System Architecture To Advance Small Satellite Mission Operations", Siewert et al., 9th Annual AIAA/Utah State University, Sep. 1995.

Marple: An Autonomous Diagnostician For Insolating System Hardware Failures, by Fesq, 1993.

"Expert Systems: A New Approach To Spacecraft Autonomy", by Cowles et al., TRW Space & Defense Quest, 1990.

IN SITU METHOD AND SYSTEM FOR AUTONOMOUS FAULT DETECTION, ISOLATION AND RECOVERY

BACKGROUND

1. Technical Field

The present invention relates generally to fault detection, identification and recovery in spacecraft; and, specifically, it relates to on-board systems which not only provide autonomous fault and onset detection and identification, but also support autonomous correction and recovery.

2. Related Art

Conventional software and hardware systems found within spacecraft, e.g., satellites, rockets, etc., continue to exhibit increasing degrees of complexity. This results in spacecraft systems which are very difficult to monitor and control from earth. To monitor a conventional spacecraft's performance from earth, large streams of data must be continuously transmitted from the spacecraft to a conventional ground support system for analysis. To attempt controlling or corrective action, the ground support system performs such analysis in real time.

If a fault or an onset of a fault is detected in spacecraft data streams during analysis of the spacecraft data stream, the ground support system responds by attempting to isolate the cause of the fault, and selects and transmits instructions (hereinafter "command sequences") to the spacecraft to attempt to recover from the fault. Through continuous monitoring and analysis of the spacecraft data stream, the ground support system determines the success or failure of the selected command sequences.

If the cause of the fault (or fault onset) is incorrectly isolated, command sequences transmitted may not only fail to correct the fault, but may also compound or create additional faults. As a result, the ground support system attempts to generate a new command sequence to attempt to recover from the previous command sequence transmitted as well as the original fault condition.

Conventional ground support personnel create command sequences for a ground based system in a ground based test configuration (hereinafter a "test bed"). Generated command sequences are verified to solve particular faults that might occur in the spacecraft systems during a mission. These verified command sequences are then called upon when determined to be needed to correct a detected fault condition as previously discussed. However, the generation of faults in the test bed, no matter how thorough, may not result in the identification of all possible spacecraft faults. Thus, numbers of highly trained, ground based personnel often have to step in to attempt to diagnose a fault condition and generate a command sequence in hopes of correcting the problem. And, of course, not all faults lend themselves to recovery.

Compounding matters, communication propagation times and available bandwidth constraints along with ground support and spacecraft processing times often yields a control feedback system that is very difficult to stabilize. In attempts to address such problems, conventional spacecraft systems are designed to enter a "safe state" upon detecting severe operating conditions. In the safe state, the spacecraft awaits ground based diagnosis and command sequences while attempting to minimize (further) damage to spacecraft systems. Moreover, during such times, the mission may be jeopardized merely as a result of entering the safe state.

To accommodate conventional spacecraft, base support systems require very complex and costly processing systems capable of receiving and processing real time spacecraft data streams. They must also rapidly identify, isolate and attempt to recover from faults. As a design goal, conventional base support systems should recover a spacecraft from all encountered faults. As can be appreciated with such conventional designs, this goal is not easily met.

SUMMARY OF THE INVENTION

Various aspects of the present invention may be found in a spacecraft having a plurality of differing components, each of which may enter a fault condition. The spacecraft exhibits operating characteristics that may evidence the fault condition of any of the plurality of differing components. In addition, the spacecraft comprises a fault detect and isolation module that monitors the operating characteristics of the spacecraft to attempt to autonomously detect and isolate the fault condition. It also comprises a fault recovery module which responds to at least the detection of the fault condition by the fault detect and isolation module by attempting to autonomously recover the spacecraft from the fault condition.

In some embodiments, the spacecraft may further comprise a safe mode module that monitors the operating characteristics of the spacecraft to attempt to detect severe fault conditions. Upon detecting such conditions, the safe mode module attempts to place the spacecraft in a safe operational state. The safe mode module may also be configured to override an ongoing attempt by the fault recovery module of autonomous recovery.

In other embodiments of the present invention, the spacecraft may also comprise a wireless transceiver and a command processor. The command processor is coupled to both the wireless transceiver and the fault recovery module. In some configurations, the fault recovery module may attempt the autonomous recovery of the fault condition via the command processor. The fault recovery module may also select at least one fault recovery script to attempt the autonomous recovery of the fault condition.

Where the fault recovery module utilizes fault recovery scripts, the wireless transceiver may receive transmissions from a ground support unit destined for the command processor. Such transmissions may constitute supplemental fault recovery scripts from the ground support unit. The supplemental fault recovery scripts may be used directly or might be delivered to the fault recovery module for subsequent attempts of autonomous fault recovery.

Further aspects of the present invention may be found in a system comprising a spacecraft and a ground support unit. Both the spacecraft and the ground support unit may communicatively couple via wireless transceivers. The spacecraft has a plurality of differing components, each of which may enter a fault condition. The spacecraft exhibits operating characteristics that may evince the fault condition of any of the plurality of differing components. This system also comprises a ground based test bed, a fault detect and isolation module and a fault recovery module. The ground based test bed is communicatively coupled with the ground support unit. The fault detect and isolation module is disposed on the spacecraft and monitors the operating characteristics of the spacecraft to attempt to autonomously detect and isolate the fault condition. In addition, the fault recovery module is also disposed on the spacecraft and responds to at least the detection of the fault condition by the fault detect and isolation module by attempting to autonomously recover the spacecraft from the fault condition using at least one of a plurality of fault recovery scripts.

In various embodiments, others of the aforementioned aspects apply to this system as well. In addition, in some configurations the fault detection and isolation module itself comprises a plurality of fault isolation sub-modules that are hierarchically arranged. Alternatively, the fault detection and isolation module may also include a feedback path for attempting to confirm isolation before the fault recovery module attempts autonomous fault recovery.

Moreover, other aspects of the present invention will become apparent with further reference to the drawings and remainder of the specification which follow.

DETAILED DESCRIPTION

Figure 1:
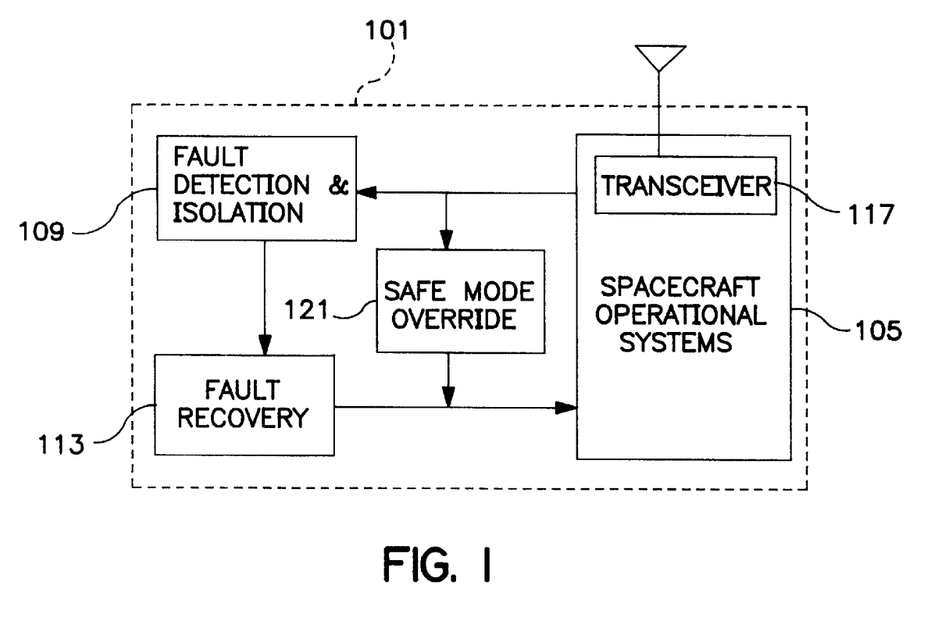
FIG. 1 is a schematic diagram that illustrates various functional aspects of an exemplary embodiment of a hardware and software system within a spacecraft built in accordance with the present invention to support autonomous fault detection, identification and recovery.

FIG. 1 is a schematic diagram that illustrates various functional aspects of an exemplary embodiment of a hardware and software system within a spacecraft built in accordance with the present invention to support fault detection, identification and recovery. In particular, a spacecraft 101, as depicted by the dashed box, is configured with hardware and software modules that monitor spacecraft operational systems 105 to autonomously attempt to identify, isolate and recover from faults. The term "autonomous," as used herein, refers to on-board spacecraft operations that are performed independent of remote, earth based support stations or "ground support stations."

To detect and isolate a fault, a fault detection and isolation module 109 monitors the spacecraft operational systems 105. If a fault is detected, the fault detection and isolation module 109 immediately attempts to isolate or "identify" the correct source of the fault, which may be any hardware and/or software component or subsystem with the spacecraft operational system 105. If the fault is detected and the source correctly isolated, the fault detection and isolation module 109 delivers such information to a fault recovery module 113. The fault recovery module 113 evaluates the detected and isolated fault and identifies an appropriate fault recovery script (or scripts) which it delivers to the spacecraft operational system 105. In response, the spacecraft operational system 105 follows the recovery script in an attempt to overcome or accommodate the isolated fault.

Even though a fault has been detected and isolated, the fault detection and isolation module 109 continues to monitor the spacecraft operational systems 105. Thus, after the fault recovery module 113 delivers the fault recovery script to the spacecraft operational systems 105, the fault detection and isolation module 109 can determine whether the recovery script has proven successful. An indication of success or failure is delivered by the fault detection and isolation module 109 to the fault recovery module 113. If failure is encountered, the fault recovery module 113 may attempt to counter the effects of the unsuccessful fault recovery script and, further, may attempt alternate fault recovery scripts and check their effect on the fault. This cyclical process occurs on board in an autonomous manner so long as alternate recovery scripts are available; and without requiring intervention from base or ground support stations (not shown). If no alternate recovery scripts are available or when no further alternate recovery scripts remain, the fault recovery module 113 places the spacecraft in a safe mode if necessary or otherwise causes the spacecraft to operate with less than-full functionality. Information regarding both the successful and unsuccessful attempts at recovery is communicated to the base or ground support stations. There such information may be analyzed in more detail so that new or replacement recovery scripts may be prepared and delivered to the spacecraft.

The spacecraft operational systems 105 may also be placed into a safe mode of operation whenever a severe fault is detected. A safe mode override module 121 also monitors operation of the spacecraft operational systems 105. Upon detecting what is categorized as a severe fault, the safe mode override module 121 immediately places the spacecraft operational systems 105 in a safe operating state. The safe mode override module 121 overrides pending operations including those defined by the fault recovery module 113 in an ongoing fault recovery script. Thus, if the autonomous fault recovery script itself causes a severe fault or if a severe fault occurs without warning, damage to the spacecraft operational systems 105 or the mission may be prevented or at least minimized.

Figure 2:
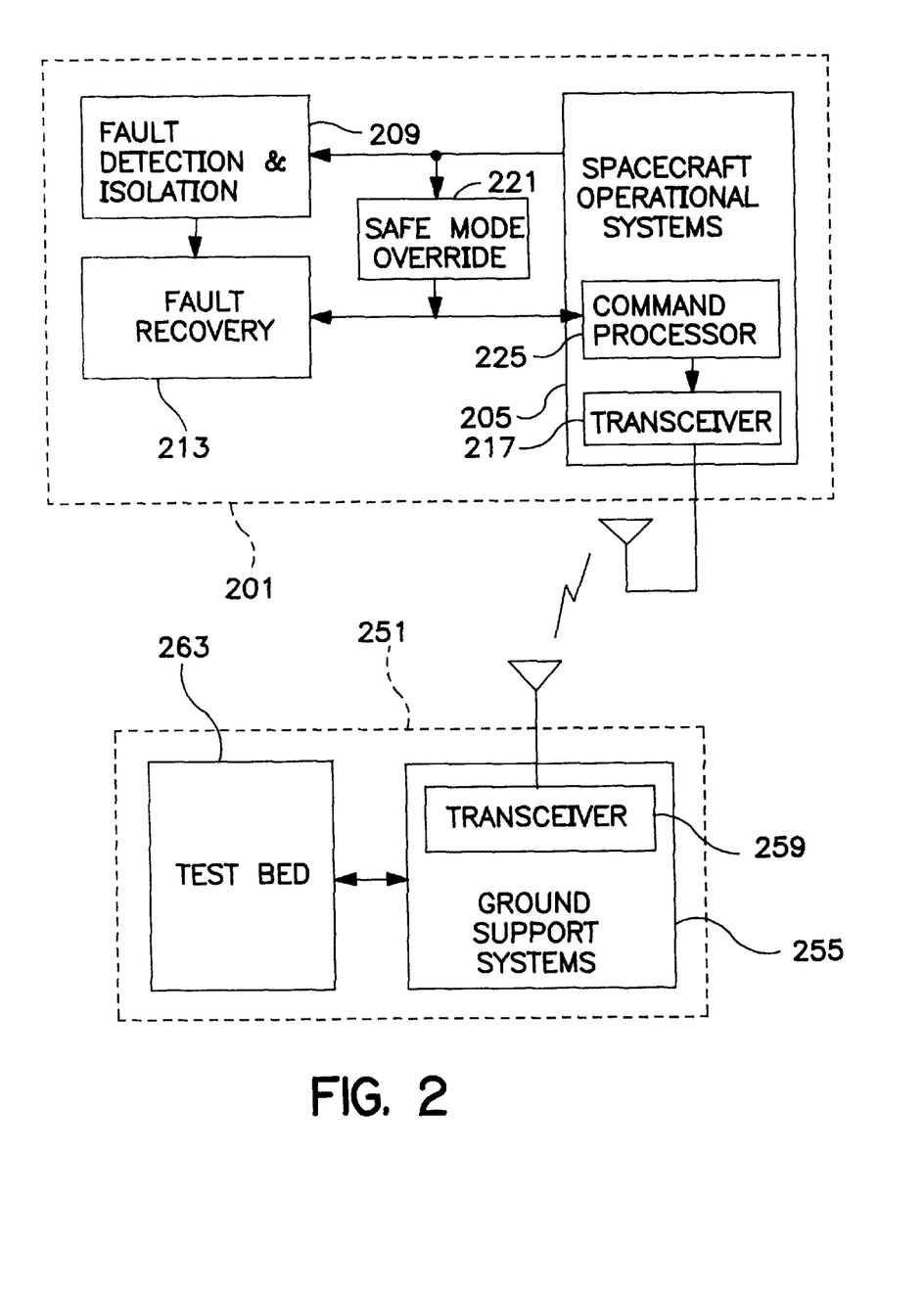
FIG. 2 is a schematic diagram illustrating the interaction of the spacecraft system of FIG. 1 with an exemplary ground support station to accommodate and support autonomous fault detection, identification and recovery in accordance with the present invention.

FIG. 2 is a schematic diagram illustrating the interaction of the spacecraft system such as that of FIG. 1 with an exemplary ground support station to accommodate and support autonomous fault detection, identification and recovery in accordance with the present invention. In particular, at a ground based station 251, a ground support unit 255 and a test bed 263 are used to monitor communications from the spacecraft and support autonomous fault operation as needed within a spacecraft 201 via a transceiver 259. As used herein, a ground support unit might comprise a monitoring system, a single computing device or a plurality of such devices forming a network, for example.

As previously discussed, to detect and isolate a fault, a fault detection and isolation module 209 monitors spacecraft operational systems 205. When a fault is detected, the fault detection and isolation module 209 attempts to isolate the source of the fault within the spacecraft operational system 205. If a detected fault is correctly isolated, the fault detection and isolation module 209 delivers such information to a fault recovery module 213. The fault recovery module 213 evaluates the detected and isolated fault and identifies an appropriate fault recovery script which it delivers to the spacecraft operational system 205.

The spacecraft operational systems 205 follow the fault recovery script delivered by the fault recovery module 213 in an attempt to overcome or accommodate the isolated fault. Fault recovery scripts typically also require the spacecraft operational systems 205 to report fault information, e.g., fault detect data, isolated fault source and recovery scripts selected, to the remote ground support unit 255 via a wireless transmission between a transceiver 217 and the transceiver 259. The transceivers 217 and 259 may comprise, for example, radio frequency or laser transceivers.

If the fault detection and isolation module 209 fails to isolate a detected fault, such information is also delivered to the fault recovery module 213. For even without isolation of the source of the fault, the fault recovery module 213 may be able to identify a script or scripts) for accommodating the detected fault and/or minimizing potential or further damage to the spacecraft operational systems 205 or the mission.

The fault detection and isolation module 209 determines whether the recovery script as proven successful through its continuous monitoring of the spacecraft operational systems 205. An indication of success or failure is delivered by the fault detection and isolation module 209 to the fault recovery module 213. If successful, the fault recovery module 213 directs the spacecraft operational systems 205 to report such success along with associated operational parameters to the ground support unit 255 via the transceivers 217 and 259.

However, if the fault detection and isolation module 209 reveals a failure in a fault recovery script delivered to the spacecraft operational systems 205, the fault recovery module 213 immediately responds by attempting to correct for the previous fault recovery script. The fault recovery module 213 also attempts to identify an alternate fault recovery script for recovering from the initial fault detected. If identified, the alternate fault recovery script is delivered to the spacecraft operational systems 205 along with the instructions for correcting for the previous fault recovery script. Again the success or failure is monitored. Unless successful or interrupted by the ground based system 255, this process continues until the fault recovery module 213 fails to identify any further alternate recovery scripts. During this process, all information regarding fault identification, isolation, recovery scripts selected and corresponding success or failure is relayed via the transceivers 217 and 259 to the ground support unit 255.

If the fault recovery module 213 fails to accommodate or correct for a fault due to a failure to identify a (or any successful) recovery script, the fault recovery module 213 may direct the spacecraft to enter a safe mode if necessary and wait for further instructions from the ground support unit 255. If the spacecraft is not placed into a safe mode, it will operate with limited functionality until otherwise instructed by the ground support unit 255. In response to received fault processing information, the ground support unit 255 may direct the spacecraft operational systems to enter a safe operating state (or "safe mode"), while ground personnel and systems contemplate preparation of a fault recovery script not presently available to the fault recovery module 213. If constructed, the remote fault recovery script may be delivered directly to the spacecraft operational systems 205 or delivered to the fault recovery module 213 for execution. The latter approach is often preferable when the remote fault recovery script must be monitored, adapted and/or disabled in an autonomous fashion. Similarly, fault detection and isolation procedures and/or associated information may be delivered to the fault detection and isolation module 209 from ground support to assist the remote fault recovery module 213 in autonomously carrying out a fault recovery script received remotely.

Ground support units and personnel may identify and verify further fault recovery scripts in the ground based test bed 263 while a spacecraft is on mission. Such fault recovery scripts may then be transmitted to the spacecraft 201 for supplementing the fault recovery module 213 and, if necessary, the fault detection and isolation module 209. In this way, autonomous fault recovery capabilities of the spacecraft 201 can be bolstered during a mission and prior to encountering such newly identified potential faults. The test bed 263 also provides a working environment prior to launch for ground personnel to identify faults and provide verification for fault recovery scripts. Thereafter, such fault recovery scripts which are loaded into the modules 209 and 213 before launch have been verified, and, thus, are unlikely to send the spacecraft operational systems 205 into a severe fault condition when executed.

As mentioned previously, some faults may require the fault recovery module 213 to immediately place the spacecraft operational systems 205 into a safe mode of operation. This may occur as part of the procedure to enable autonomous recovery from the fault, or may occur simply as a stop gap measure until the ground support unit 255 (and/or the ground support personnel) responds. Additionally, a safe mode override module 221 also monitors operation of the spacecraft operational systems 205. Upon detecting what are considered to be severe faults, the safe mode override module 221 immediately places the spacecraft operational systems 205 in a safe operating state and informs the ground support unit of the occurrence. The safe mode override module 221 overrides the fault recovery module 213 regarding pending operations of the spacecraft operational systems 205. With this approach, if the autonomous fault recovery itself causes a severe fault or if a severe fault occurs without warning, damage to the spacecraft operational systems 205 or the mission may be prevented or minimized.

If the safe mode override module 221 places the spacecraft operational systems 205 into a safe state, the ground support unit 255 may control resetting the module 221 and restoring the system 205 to a normal operating state. Alternately in other embodiments, the ground support unit 255 may delegate such responsibilities to the fault recovery module 213, via a delivered fault recovery scripts constructed on the ground possibly via the test bed 263, to accommodate further autonomous fault recovery sequencing. Although the fault recovery module 213 may also contain predefined fault recovery scripts for autonomously resetting the module 221 and restoring the system 205, often times it may prove beneficial to require review of the severe fault conditions by ground support before such scripts are carried out.

The safe mode override module 221, as illustrated, operates independently from the modules 209 and 213. Although the functionality of the override module 221 could be combined within the modules 209 and 213, independence might degrade along with the aforementioned performance. One might, however, combine the fault detection portion of the fault detection and isolation module 209 with the fault detection portion of the override module 221, and still benefit from the override portion of the override module 221 bounding the fault isolation portion of the fault detection and isolation module 209 and the fault recovery module. Alternatively, the safe mode override module 221 might be entirely removed from the spacecraft 201. Such removal might prove desirable where the fault detection and isolation module 209 and the fault recovery module 213 provide adequate substitute performance, for example, via redundancy and rapid safe mode performance.

In the illustrated embodiment, communication both between the fault recovery module 213 and the spacecraft operational systems 205 and between the ground support unit 255 and the spacecraft operational systems 205 occurs via a high level command processor module 225. The command processor module 225 receives and processes high level commands that minimize wireless bandwidth in communicating instructions from the ground support unit 255. Although the fault recovery module 213 need not deliver such high level commands (and instead operate either directly with the spacecraft operational systems 205 or indirectly via a different command processing module), such operation exhibits advantages. The high level commands also enable support personnel to easily construct fault recovery scripts (pre or post launch) or otherwise interact with the spacecraft 201. It also minimizes the overall system complexity via a single standard interface to the spacecraft 201 or its constituent parts, decreasing potential other fault conditions.

Therefore, for example, a series of verified high level commands generated in the test bed 263 (e.g., in the form of a fault recovery script) can be delivered without translation via the ground support unit 255 via the transceiver 259 to the spacecraft 201. Upon receipt, the high level commands are delivered to the command processor module 225 for controlling the spacecraft 201 to support direct (non-autonomous) fault recovery or non-fault mission objectives. Similarly, using the same high level commands, trained personnel may also generate scripts executable by and stored within the spacecraft operating systems 205 to support mission objectives unrelated to faults. Otherwise, as previously noted, the high level commands may constitute fault recovery scripts delivered for storage and use by the fault recovery module 213. Similarly, high level scripts may also be used to define further functionality or to provide further information for the fault detection and isolation module 209.

Figure 3:
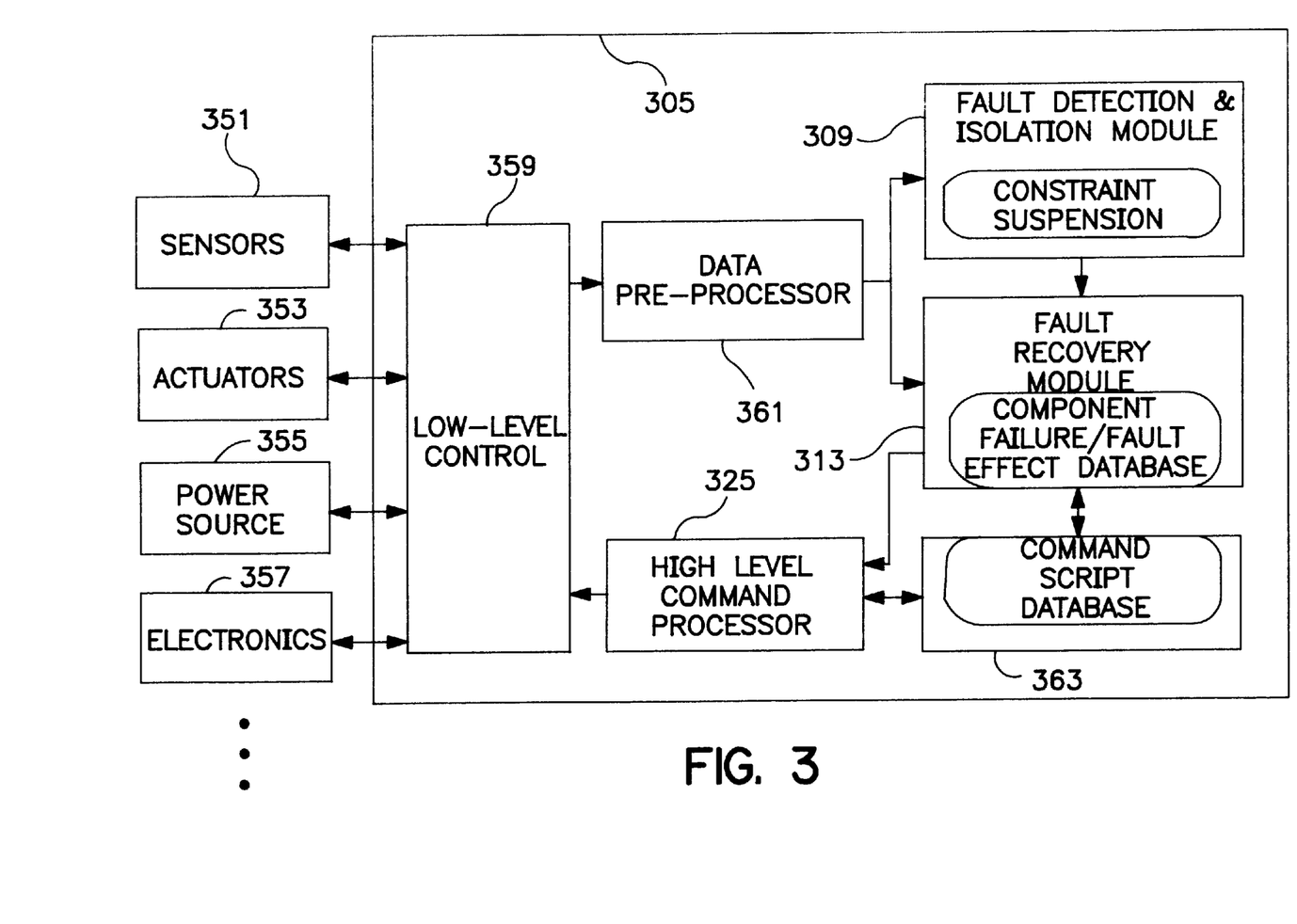
FIG. 3 is a schematic diagram illustrating an exemplary embodiment of portions of the spacecraft system of FIGS. 1 and 2, further illustrating operation of autonomous fault processing in accordance with the present invention.

FIG. 3 is a schematic diagram illustrating an exemplary embodiment of portions of the spacecraft system of FIGS. 1 and 2, further illustrating variations of the operation of autonomous fault processing in accordance with the present invention. A fault detection and isolation module 309 and a fault recovery module 313 operate together to identify and isolate faults, select fault recovery scripts and evaluate recovery success/failure.

A low level control module 359 receives data/measurements from target hardware/software subsystems 351, 353, 355 and 357. Such data/measurements are that needed to adequately detect fault occurrences related to the target subsystems 351, 353, 355 and 357. As illustrated, the target systems may comprise sensors, actuators, power sources and operational electronics (representing various other circuitry and software subsystems), for example. A low level control module 359 gathers the data/measurements from the target subsystems 351, 353, 355 and 357, and relays the data/measurements to a preprocessor 361. The preprocessor 361 preprocesses the data/measurements to ensure compatibility with the fault detection and isolation module 309. The preprocessor 361 delivers the preprocessed data/measurements to the fault detection and isolation module 309.

In the illustrated embodiment, the fault detection and isolation module 309 comprises a model-based reasoning program based on a technique known as "constraint suspension." In particular, the module 309 comprises a generic engine and a plurality of software models imbedded in a CPU 305 of the spacecraft. Further detail regarding this model-based reasoning program may be found in a doctoral thesis entitled "MARPLE: An Autonomous Diagnostician for Isolating System Hardware Failures," published in 1993 at UCLA. Although constraint suspension techniques are used in this embodiment, many other conventional mechanisms for detecting and isolating fault might alternately be used.

The fault detection and isolation module 309 propagates the preprocessed data/measurements received from the preprocessor 361 through the plurality of software models and uses tolerance checks to determine if inconsistencies exist between the hardware units and the low-level commands, where inconsistencies are defined as off-nominal behavior. Then, if an inconsistency is found, the fault detection and isolation module 309 uses an extension of constraint suspension to autonomously isolate the faulty component.

Thereafter and periodically on a cycle by cycle basis, the fault detection and isolation module 309 delivers a message to the fault recovery module 313 indicating system status. Messages indicating fault contain an identification number corresponding to the faulty component isolated.

The fault recovery module 313 responds to messages indicating fault by performing two actions. First, the fault recovery module 313 accesses a predefined component failure/fault effect database to determine if any fault recovery command scripts, or any command scripts related to normal operations, need to be disabled, modified or replaced due to the faulty component. When necessary, the component failure/fault effect database contains the functional dependencies between components and stored fault recovery command scripts. The fault recovery module 313 sets enable/disable flags in a command script database 363 to disable all fault recovery command scripts that require the faulty component. When possible, instead of merely disabling a command script, the fault recovery module 313 will modify or replace the command script to permit partial or alternate operational functionality. Thus, this approach considers the effects of the fault on the entire system.

Because failures in different modes of operations may require different recovery procedures, the fault recovery module 313 next executes fault recovery logic subroutines to determine the appropriate fault recovery command script to run. This script number is then communicated to a high level command processor 325. Of course the fault recovery command script (or "fault recovery script" as used herein) communicated may often comprise a plurality of high level scripts that are needed to address many corresponding effects that the fault has caused the system.

In response, the high level command processor 325 accesses the command script database 363 at the location corresponding to the fault recovery and normal operation script number. It then checks low and high level system and hardware constraints to verify that the required fault recovery script does not violate any rules. If the fault recovery script is valid, the high level command processor 325 sends the fault recovery script to the low level control module 359 without waiting for external (remote) intervention. The low level control module 359 carries out the script via the appropriate one(s) of the target subsystems 351, 353, 355 and 357.

Further detail regarding the interaction of the script database 363 and the high level command processor 325 during normal operations using command scripts can be found in U.S. patent application Ser. No. 08/865,290, now U.S. Pat. No. 5,951,609, issued Sep. 14, 1999 entitled "Method and System for Autonomous Spacecraft Control," filed on even date herewith by Hanson et al. Such application is hereby incorporated herein by reference in its entirety.

Figure 4:
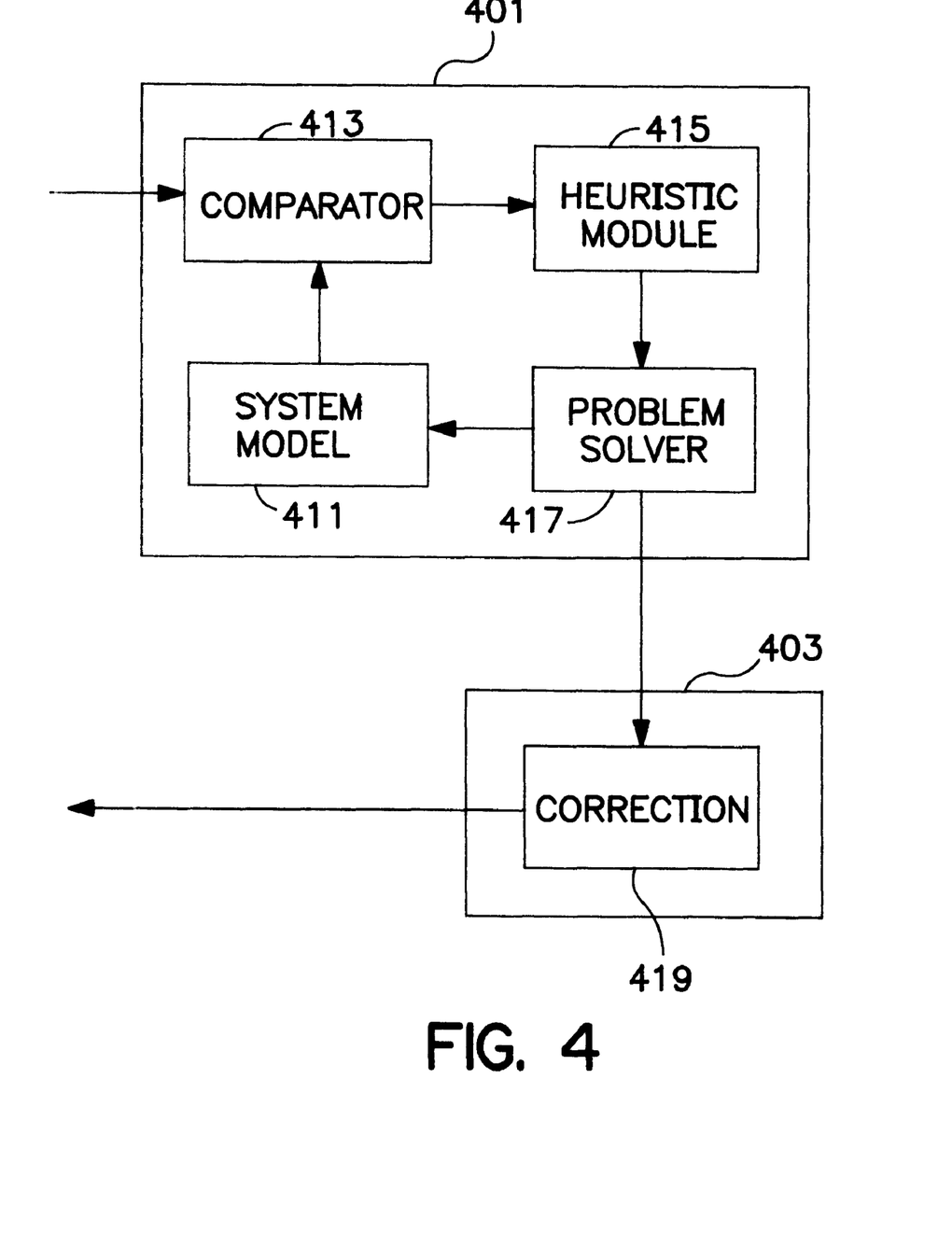
FIG. 4 is a schematic diagram of an alternate embodiment of the fault detection and isolation and fault recovery modules of FIGS. 1–2.

FIG. 4 is a schematic diagram of an alternate embodiment of the fault detection and isolation and fault recovery modules of FIGS. 1–2. A fault detection and isolation module 401 and a fault recovery module 403 operate to provide autonomous fault identification, isolation and recovery in a remote system such as a spacecraft in much the same way described previously in reference to counterpart modules described in reference to FIG. 1, for example.

More particularly, within the fault detection and isolation module 401, a system model 411 (or plurality thereof) generates predicted system behavior for delivery to a comparator 413. The comparator 413 compares the predicted system behavior with actual system behavior that is also received by the comparator 413. The comparator 413 delivers the results of the comparison to a heuristic module 415 for evaluation. Using empirical spacecraft knowledge, e.g., such as reliability data relating to individual components or subsystems, the heuristic module 415 attempts to generate a suggested failure type. In response, a problem solver module 417 utilizes the suggested failure type in attempts to narrow the possibilities and identify (isolate) the component which failed. Alternatively, if the heuristic module 415 fails to suggest a failure type, the problem solver module 417 must resort to a broader set of possibilities when attempting to identify the fault. In either case, of course, such identification actually constitutes a hypothesis, because the system has not attempted verification.

Hypotheses generated by the problem solver module 417 are delivered to the system model 411 for generation of a new prediction of system behavior. This process of cycling between the modules 413, 415, 417 and 411 continues until the comparator 413 identifies a match between current predicted and actual system behavior. The problem solver module 417 responds to the matching event (via the module 415) to deliver the hypothesis to the fault recovery module 403. A correction module 419 therein responds to the delivery by attempting to correct the spacecraft operational systems via diagnosis and prior history.

As may be appreciated, although the heuristic module 415 need not exist for the fault detection and isolation module 401 to work properly, the heuristic module 415 enhances the operation. It does so by, among other things, accelerating the process of isolating fault. It also helps focus the isolation search on highly likely component failure types in what might otherwise be surrounded by a sea of highly unlikely failure types.

Figure 5A:
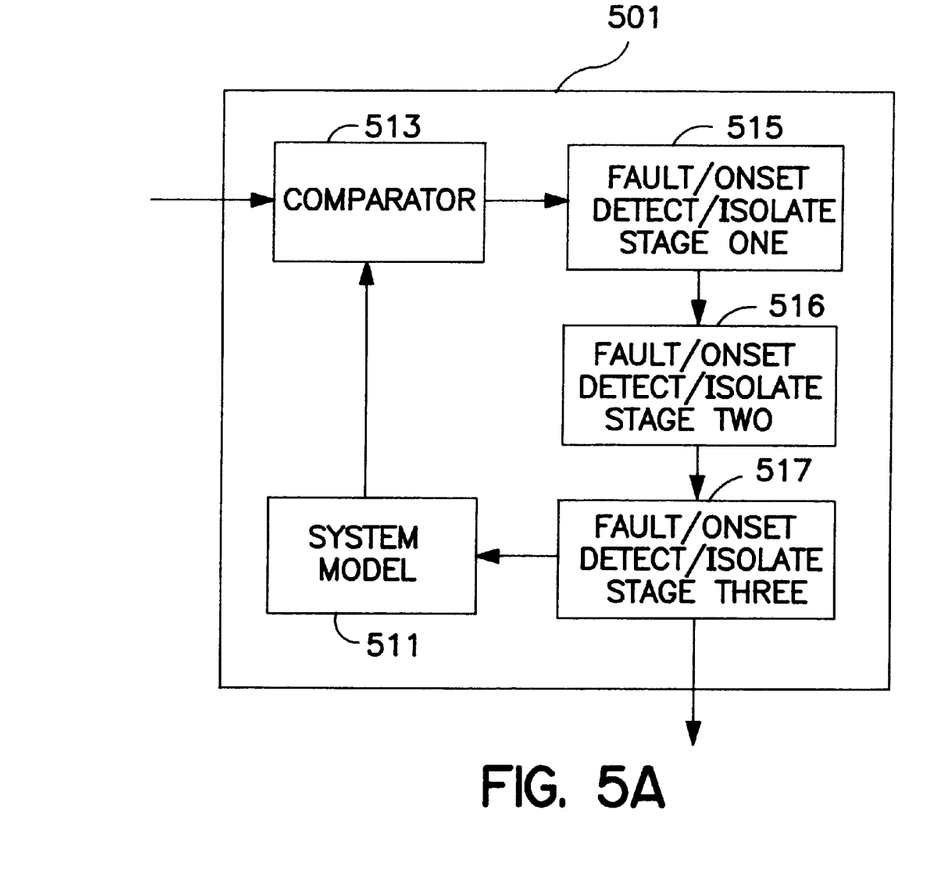
FIGS. 5a and 5b are schematic diagrams illustrating further embodiments of the fault detection and isolation module of FIGS. 1–2.
Figure 5B:
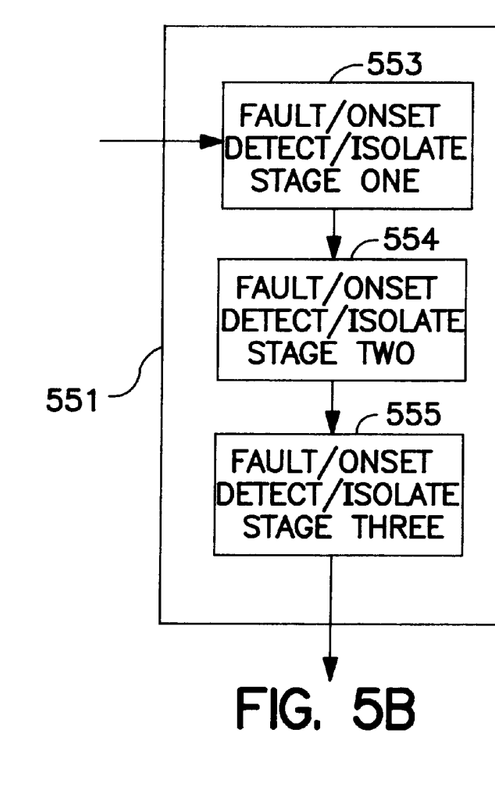

FIGS. 5a and 5b are schematic diagrams illustrating further embodiments of the fault detection and isolation module of FIGS. 1–2. Specifically, FIG. 5a offers an illustration of a further variation of that found in FIG. 4 in the form of a fault detection and isolation module 501. As before, a system model module 511 generates predicted system behavior. A comparator 513 compares the predicted system behavior with that of actual behavior and delivers the results of the comparison to a first stage fault detection and isolation module 515. In the first stage module 515, the heuristics described above in reference to the heuristic module 415 (FIG. 4) is applied to prioritize and possibly narrow the field of possible faults. The results of the first stage module 515 is delivered to a second stage fault detection and isolation module 516 which performs fault detection at a subsystem level, attempting to further narrow the field of possible faults. The results of the second stage module 516 is then passed to a third stage fault detection and isolation module 517 which attempts to isolate the actual failed component within suggested subsystems identified by the second stage module 516.

With this hierarchical approach to detecting fault, it can be appreciated that at least speed can be enhanced in the process of isolation. The hierarchical approach takes advantage of specific benefits offered by different types of approaches to fault detection while avoiding their limitations. Moreover, although only three particular types of approaches are illustrated at the modules 515–517, many other types of approaches and various combinations thereof might also be employed.

FIG. 5b provides a further variation of the fault detection and isolation module of FIG. 4. In particular, instead of using the comparator 413 and the system model module 411 (FIG. 4), a fault detection and isolation module 551 comprises a first, second and third stage fault detect modules 553–555 which correspond in functionality to the modules 515–517 of FIG. 5a. However, the final hypothesis generated at the module 555 may be considered sufficient for delivery to a fault detection module (not shown).

Figure 6:
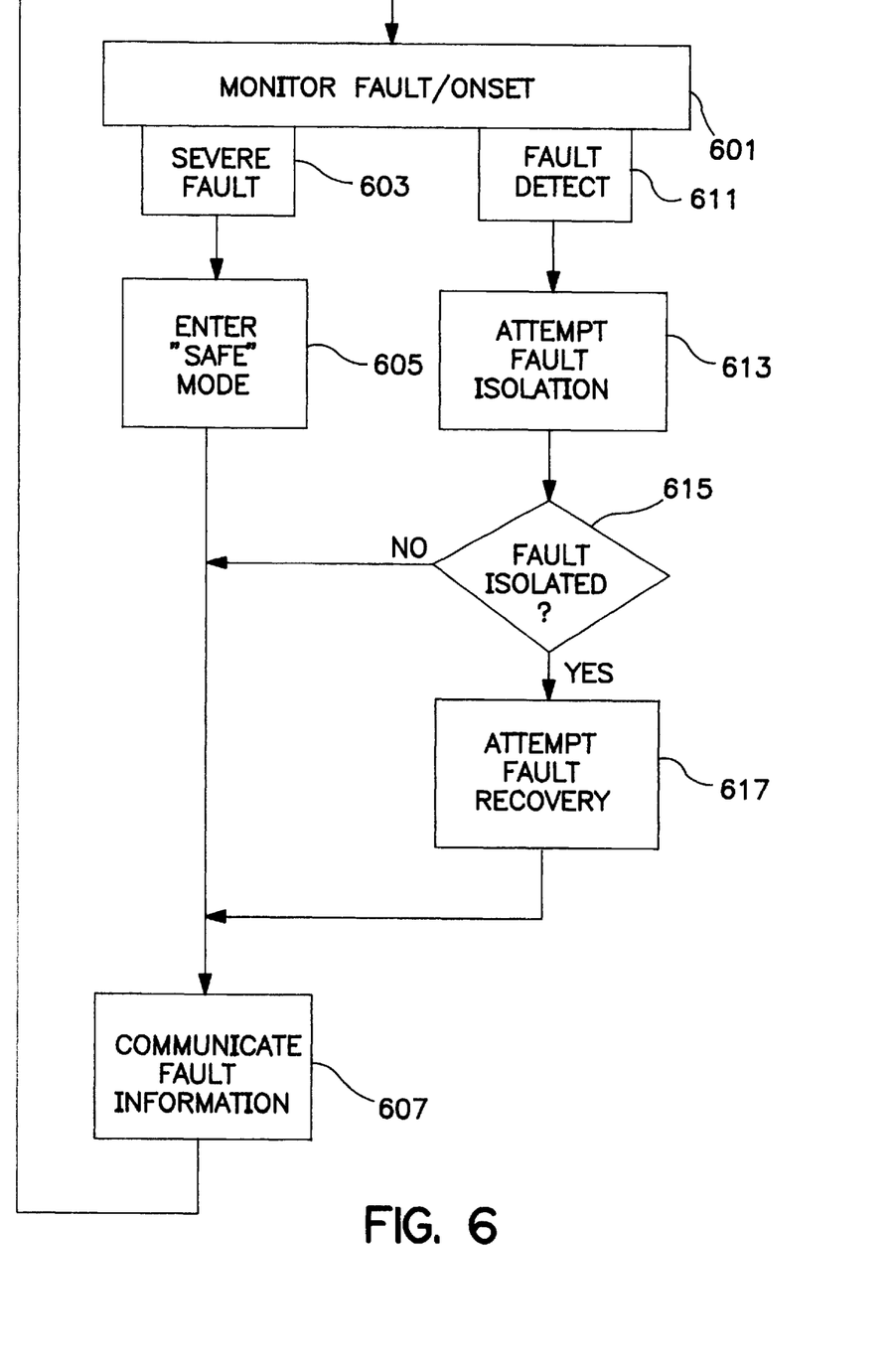
FIG. 6 is an exemplary flow diagram that illustrates the functionality of the spacecraft systems of FIGS. 1–5b in accordance with the present invention.

FIG. 6 is an exemplary flow diagram that illustrates typical functionality of the spacecraft systems of FIGS. 1–5b in accordance with the present invention. For example, referring to typical modules found in FIG. 1, a fault detect module monitors the behavior of spacecraft operational systems in an attempt to detect fault at a block 601. Also at the block 601, the safe mode override module monitors such behavior. If the safe mode override module detects a severe fault condition, as represented by an event block 603, the override module places the spacecraft operational systems into a safe mode or state at a block 605. Thereafter, at a block 607, information regarding the severe fault is communicated wirelessly to the ground support unit where further direction regarding fault identification, isolation and recovery may originate.

Alternately, at the block 601, if the fault detection and isolation module detects a fault, as indicated by a block 611, the fault detection and isolation module attempts to isolate the fault at a block 613. If successful, as determined at a block 615, the fault recovery module will respond at a block 617 by attempting fault recovery. The information regarding the fault, including for example the fault type and selected fault detect script or scripts used, is communicated to the remote ground support unit at the block 607. Thereafter, the fault detection and isolation module returns to the block 601 to evaluate the effects of the attempted fault recovery. Similarly, fault information is also communicated at the block 607 if the fault detection and isolation module fails to isolate the fault as determined at the block 615.

Because the fault detection and isolation module and the fault recovery module together operate independently from the safe mode override module, detection and parallel processing of events may exist. Under such circumstances, as previously mentioned, the safe mode override module governs and, thereby, bounds the fault recovery module. Among other benefits, this provides a rapid mechanism for shutting down the system as soon as severe faults occur without having to wait for the processing complexities and delays associated with fault isolation. It also bounds any result of incorrect hypotheses that may cause a severe fault.

The use of the term "modules" as used herein with refers generally to hardware and software, alone or in combination, which carries out the particular functionality at issue. Moreover, the term "module" is not meant to imply that each given module is distinct in both hardware and software from all other modules, even though this may sometimes be the case. Even so, in many cases, the underlying hardware (and possibly software) of one module may overlap that of several others. In other words, the term refers to functional modules and not physical modules.

Furthermore, as used herein recovery from a specific fault might constitute, for example, one or more of: 1) redundant hardware replacement; 2) redundant software replacement; 3) software replacement to failing hardware; 4) software patches that provide substandard yet acceptable operation; 5) cancellation of specific but not all of mission functionality; or 6) otherwise adapting to available resources to carry out needed tasks.

In view of the above detailed description of the present invention and associated drawings, other modifications and variations will now become apparent to those skilled in the art. For example, although the functionality associated with fault detection and correction herein is illustrated in context of spacecraft embodiments, such functionality could also be placed within any remote non-spacecraft system which does not lend itself to non-autonomous approaches for fault management, e.g., aircraft, submarines or power plants. Moreover, it should also be apparent that such and other modifications and variations may be effected without departing from the spirit and scope of the present invention as set forth in the claims which follow.

What is claimed is:

1. In a spacecraft system comprising a plurality of differing components operating in multiple modes of operation and conditions including fault conditions, the spacecraft system exhibiting operating characteristics indicating said fault conditions, apparatus comprising:

a fault detect module monitoring said operating characteristics of the spacecraft system and detecting said fault conditions of said components based on said operating characteristics of the spacecraft system; and a fault recovery module storing a plurality of fault recovery command scripts, disabling or modifying said fault recovery command scripts involving said detected fault conditions, selecting said plurality of fault recovery command scripts based on an output from said fault detect module and the mode of operation of said system, and performing a recovery process with said selected fault recovery command scripts to attempt to recover from said fault condition.

2. The apparatus of claim 1 and further comprising a safe mode module monitoring the operating characteristics of the spacecraft system to detect severe fault conditions; and, upon detecting said severe fault conditions, said safe mode module overriding said fault recovery module and placing the spacecraft system in a safe operational state.

3. The apparatus of claim 1 and further comprising a wireless transceiver and wherein said fault recovery module comprises a command processor coupled to both the wireless transceiver and the fault recovery module, said fault recovery module performing said recovery process of the fault conditions via the command processor, said command processor receiving high level commands from said transceiver and processing said high level commands to generate said fault recovery command scripts in response to said high level commands.

4. The apparatus of claim 3 wherein the wireless transceiver receives transmissions comprising said high level commands from a ground support unit directed to the command processor.

5. The apparatus of claim 4 wherein the wireless transceiver receives supplemental fault recovery scripts from the ground support unit.

6. The apparatus of claim 5 wherein the supplemental fault recovery scripts are delivered to the fault recovery module for subsequent attempts of autonomous fault recovery.

7. A system comprising a spacecraft and a ground support unit communicatively coupled via wireless transceivers, the spacecraft comprising a plurality of differing components operating in multiple conditions including fault conditions, the spacecraft exhibiting operating characteristics indicating said fault conditions, the system comprising:

a ground based test bed generating high level commands defining fault recovery instructions, said high level commands being transmitted to said spacecraft via said wireless transceivers;

a fault detect module disposed on the spacecraft monitoring the operating characteristics of the spacecraft and detecting said fault conditions; and a fault recovery module disposed on the spacecraft generating a first fault recovery script in response to an output from the fault detect module, performing a first recovery process based on said first fault recovery script, generating a second fault recovery script in response to said high level commands and performing a second recovery process based on said second fault recovery script to attempt to recover from said fault conditions.

8. The system of claim 7 wherein said second fault recovery script is executed when the spacecraft fails to autonomously recover from a fault condition.

9. The system of claim 7 and further comprising a safe mode module detecting severe fault conditions based on the operating characteristics of the spacecraft and upon detecting said severe fault conditions, the safe mode module overriding the fault recovery module and placing the spacecraft in a safe operational state.

10. In a spacecraft system comprising a plurality of subsystems and components operating in multiple conditions including fault conditions, the system exhibiting operating characteristics indicating fault conditions of said subsystems and fault conditions of said components, apparatus comprising:

a fault detect system disposed on the spacecraft monitoring the operating characteristics of the system and detecting said fault conditions, said fault detect system comprising a system model module generating predicted operating characteristics of said components and modifying said predicted operating characteristics in response to identification of said components operating in said fault conditions, a comparator module comparing said predicted operating characteristics of said components with the actual operating characteristics of said components, generating results of said comparing and further generating a match in the event that said results indicate a predetermined relationship between said predicted operating characteristics and said actual operating characteristics, a first fault detection module responsive to said results to generate a suggested failure type, a second fault detection module responsive to said suggested failure type to identify said subsystems operating in said fault conditions, a third fault detection module responsive to the identification of subsystems by said second fault detection module to identify said components operating in said fault conditions and to transmit said identification of said components to said system model module; and a fault recovery module generating a fault recovery script in response to the identification of said components by said third fault detection module and said match, said fault recovery module performing a recovery process based on said fault recovery script to attempt to recover from said fault conditions.

11. Apparatus, as claimed in claim 10, wherein said first fault detection module comprises a heuristic module.

12. Apparatus, as claimed in claim 10, and further comprising a safe mode module monitoring the operating characteristics of the system to detect severe fault conditions, and, upon detecting said severe fault conditions, overriding said fault recovery module and placing the system in a safe operational state.

13. In a spacecraft system comprising a plurality of components operating in a plurality of operating modes and a plurality of conditions including fault conditions, said system exhibiting operating characteristics indicating fault conditions of said components, a method comprising:

monitoring said operating characteristics of the system;

detecting said fault conditions of said components based on said operating characteristics of the system;

storing a plurality of fault recovery command scripts;

disabling or modifying any of said fault recovery command scripts involving said fault conditions or involving said components detected in said fault conditions;

selecting a non-disabled one of said plurality of fault recovery command scripts based on said detecting and based on the operating mode of said system; and performing a recovery process with said selected fault recovery command script to attempt to recover from said fault conditions.

14. The method of claim 13 and further comprising:

monitoring the operating characteristics of the system to detect severe fault conditions; and overriding said performing a recovery process by placing the system in a safe operational state in response to said detection of said severe fault conditions.

15. The method of claim 13 wherein said system further comprises a transceiver and wherein said method further comprises:

receiving high level commands through said transceiver; and processing said high level commands to generate said fault recovery command scripts in response to said high level commands.

16. In a system comprising a spacecraft and a ground support unit, including a ground test bed, the spacecraft comprising a plurality of differing components operating in a plurality of conditions including fault conditions, the spacecraft exhibiting operating characteristics indicating said fault conditions, the method comprising:

generating with said test bed high level commands defining fault recovery instructions;

transmitting said high level commands to said spacecraft;

monitoring at said spacecraft said operating characteristics;

detecting at said spacecraft said fault conditions in response to said operating characteristics;

performing a first fault recovery process by generating and executing a first fault recovery script generated in response to said detected fault conditions to attempt to recover from the detected fault conditions; and performing a second recovery process by generating and executing a second fault recovery script generated in response to said high level commands to attempt to recover from the detected fault conditions.

17. The method of claim 16 wherein said second fault recovery script is executed when said first recovery process fails to result in recovery from said detected fault conditions.

18. The method of claim 16 and further comprising:

detecting severe fault conditions based on said operating characteristics; and overriding said performing a first recovery process and overriding said performing a second recovery process by placing the spacecraft in a safe operational state in response to detecting said severe fault conditions.

19. In a spacecraft system comprising a plurality of subsystems and components operating in multiple conditions including fault conditions, the system exhibiting operating characteristics indicating fault conditions of said subsystems and fault conditions of said components, a method comprising:

monitoring on the spacecraft the operating characteristics of the system;

detecting on the spacecraft system said fault conditions;

generating on the spacecraft system predicted operating characteristics of said components;

comparing on the spacecraft system said predicted operating characteristics of said components with the actual operating characteristics of said components;

generating results of said comparing;

generating a match in the event that said results indicate a predetermined relationship between said predicted operating characteristics and said actual operating characteristics;

generating a suggested failure type in response to said results;

identifying said subsystems operating in said fault conditions in response to said suggested failure type, identifying components operating in said fault conditions in response to said identification of said subsystems operating in said fault conditions;

using said identification of said components operating in said fault conditions to alter said predicted operating characteristics of said components;

generating a fault recovery script in response to the identification of said components and said match; and performing a recovery process based on said fault recovery script to attempt to recover from said fault conditions.

20. A method, as claimed in claim 19, wherein said identifying a suggested failure type is conducted by a heuristic process.

21. A method, as claimed in claim 19, and further comprising monitoring the operating characteristics of the system to detect severe fault conditions, and, upon detecting said severe fault conditions, overriding said performing a recovery process and placing the system in a safe operational state.

* * * * *